July 24, 1934.   R. J. GITS   1,967,614
LUBRICATING DEVICE
Filed April 28, 1932
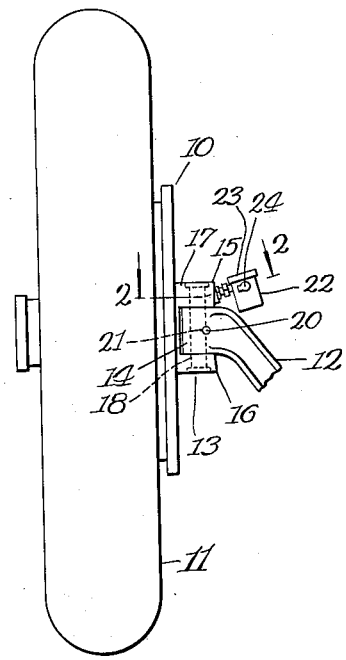
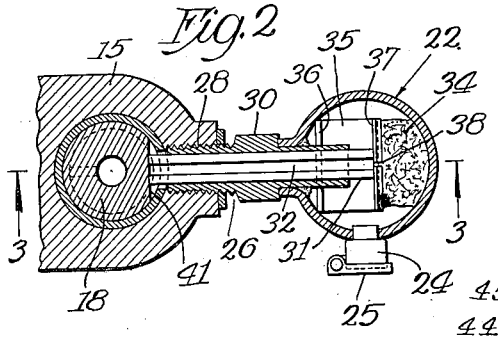
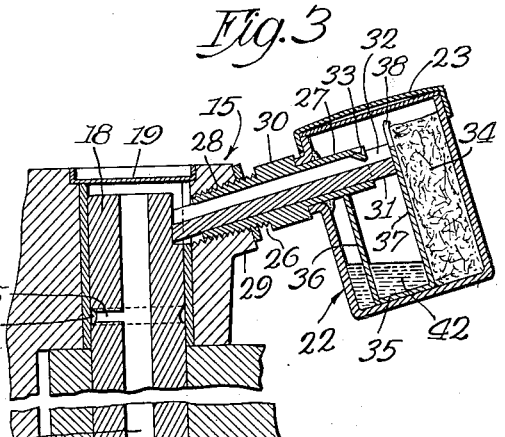
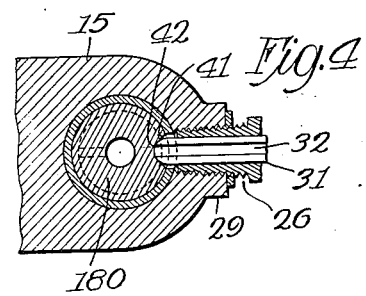
Inventor
Remi J. Gits
By Gillson, Maunsley Attys.

Patented July 24, 1934

1,967,614

UNITED STATES PATENT OFFICE 1,967,614

LUBRICATING DEVICE

Remi J. Gits, Riverside, Ill.

Application April 28, 1932, Serial No. 607,959

16 Claims. (Cl. 308—120)

This invention relates to lubricating devices, and, more particularly, to the type which is automatically operated.

A further object of the invention is the provision of a lubricating device that may be employed for lubricating shafts, journals and the like that require lubrication constantly or at frequent intervals.

A further object of the invention is the provision of a lubricating device that is simple in construction, inexpensive to manufacture, efficient in operation and that may be applied with a minimum of time and labor.

Other and further objects and advantages of the invention will appear from the following description, taken in connection with the accompanying drawing, in which Fig. 1 is a front elevation of a portion of an automobile showing the invention in position thereon;

Fig. 2 is a section on the line 2—2 of Fig. 1;

Fig. 3 is a section on the line 3—3 of Fig. 2; and

Fig. 4 is a horizontal section through the bearing and king-bolt showing a modified form of construction.

For the purpose of illustrating one embodiment of the invention, which is by way of example only, the device is disclosed as being employed for lubricating a portion of the steering mechanism of an automobile. Referring now to the drawing, the reference character 10 designates a portion of an automobile comprising a front wheel 11, a front axle 12 and a steering knuckle 13. The steering knuckle is of the usual or well-known construction, and, as shown, the outer end 14 of the axle 12 is positioned between the furcations or projections of the stub axle or spindle 17. These projections form the steering knuckle bearings 15 and 16, as will presently appear. A ball bearing 40 may be used in connection with the bearing or projection 16, if desired. The end portion 14 and bearings 15 and 16 have aligned openings through which the king bolt or steering knuckle bolt 18 extends. The king bolt 18 preferably terminates below the upper surface of the bearing 15 and a cap 19 pressed into a counter bore closes the upper end of the king bolt opening in said bearing.

It is held from movement relative to the end portion 14 of the axle 12 in any suitable manner, as by means of a bolt 20 that engages a groove 21 in the king bolt 18. The spindle is adapted to turn relative to the bolt 18 in steering the vehicle. The structure thus far described is old in the art and need not be further considered.

In order that the steering mechanism may operate smoothly and easily, it is necessary that this mechanism especially the steering knuckles be kept in lubricated condition. Since the parts are exposed to the road dust and the like, it is difficult to maintain the parts lubricated by the present system of using high pressure grease guns at infrequent intervals, and, as a result, the steering becomes more or less laborious. The present system seeks to remedy this defect by the provision of means for automatically lubricating the steering knuckles during the operation of the vehicle.

In the form of construction selected to illustrate one embodiment of the invention, a lubricating device is employed which is adapted to be operated upon the turning or steering of the wheels. As shown, this device comprises a reservoir or receptacle 22 which is adapted to contain oil. The receptacle is closed at its upper end by a cap 23 which is held in position by friction but which may be removed.

Preferably, however, the cap makes a press fit and can be removed only with great difficulty, if at all.

The side wall of the receptacle is provided with an oil passage or cap 24 through which oil is introduced into the receptacle by the ordinary oil can, or the like, in the usual manner. The passage or cap 24 is closed by a spring pressed lid or closure 25, as is common in such constructions.

Suitable means are provided for transferring the oil from the receptacle to the steering knuckle. As shown a sleeve 26 has one end 27 extending into the receptacle 22 and rigidly secured thereto in any suitable manner as by welding, or the like. The opposite end of this sleeve is screw threaded into an opening 28 in the upper bearing or projection 15 of the steering knuckle. This sleeve is provided with an angular portion 30 for receiving a wrench for turning the sleeve for securing it in position in the opening 28. In the type of automobiles where the outer end 14 of the axle 12 constitutes the bearing for the king-pin, the sleeve 26 will be attached to the member 14. In other words, in any form of construction the lubricating device will be attached to the bearing.

If desired, the projection 15 may be provided with a boss 29 through which the opening extends.

A plunger 31 is slidably mounted in the sleeve 26, and is provided with an oil passage 32, which is preferably in the form of a channel on its upper side extending longitudinally thereof along which oil is conducted to the steering knuckle, as will presently appear. The sleeve 26 is provided with a depending finger 33, which is adapted to engage in the channel or groove for positioning said groove.

Oil is supplied to the channel 32 in the following manner. A wick or pad 34, of felt or the like, is placed within the receptacle and is kept oil saturated by capillarity from oil therein. Means are provided whereby steering of the wheels will compress this pad and cause it to deposit oil in the passage 32, which in turn is conducted to the bearing.

The pad is held in upright position by a wick-holding member 35. This member may be of any suitable form or construction. As shown, it comprises a U-shaped piece of sheet metal having one arm or plate member 36 engaging beneath the inner end of the sleeve 26 and also engaging the wall of the receptacle for positioning said member within said receptacle. The other arm 37 extends upwardly above the plunger 31, and is in engagement with the end thereof. The arm 37 is provided with a small opening which may be in the form of a slot 38 in the vertical plane of the groove 32. This slot is narrow, since only a small amount of oil is required to lubricate the king pin 18.

The inner end of the plunger 26 is in engagement with a cam surface 41, provided on the bolt 18. In the construction shown in Figs. 2 and 3, the cam surface 41 is merely a flattened portion on the king bolt.

In the operation of the device, oil is supplied to the receptacle 22 through the opening. The wick or pad 34 becomes saturated and is maintained in that condition by capillarity as long as there is any oil 42 in the receptacle. When the wheel 11 is turned by the steering mechanism, the bearings 15 and 16 will turn relative to the king bolt 18 and the cam surface will force the plunger 31 outwardly against the arm or plate 37 which, in turn, will compress the pad 34. The pressing of the plate 37 against the pad 34 will cause a drop or small amount of oil to pass from the compressed pad through the slot 38 into the groove 32. When the front wheels are returned to straight ahead position, the pressure on the pad or wick 34 will be released. The resiliency of the plate 37 and pad 34 will return them to normal position after compression. When the pad is released, air pressure and capillarity will cause oil to rise in the pad for saturating the same in readiness for the next compression.

The sleeve is preferably so attached to the member 15 that it extends upwardly and outwardly therefrom whereby oil forced through the slot 38 therein will flow by gravity along the slot 32 to the steering knuckle bearings.

In order to prevent the pad from withdrawing oil from the groove 32 when pressure thereon is released, the slot 38 terminates above the bottom of the groove 32 whereby a barrier is provided for preventing the return of the oil to the pad.

When the pressure is released, the resiliency of the pad 34 and plate 37 will maintain the plunger 31 in normal position in contact with the cam.

By utilizing a flattened surface on the bolt, there will be but slight compression of the pad where the angular movement of the steering wheel is small. Under certain conditions, it may be desirable to increase the pressure on the pad for a given angular movement of the front wheel for furnishing increased amount of oil to the steering knuckle. This may be accomplished by changing the form of the cam on the king bolt.

In Fig. 4 is shown a modified form of cam arrangement for this purpose. In this construction the cam is formed by a recess 41 in the king bolt 180. This recess may be of any form, that shown being curved in cross section and the plunger is provided with a corresponding curved inner end 42 for cooperating with the cam surface formed by the recess 41. It will be evident from an inspection of Fig. 4 that a slight angular movement of the bearing 15 will result in considerable movement of the plunger 42 with a corresponding compression of the pad for supplying oil to the groove 32.

While the passage for conducting the oil from the pad to the bearing is in the form of a groove instead of a bore through the plunger, it is understood that either form may be employed, the groove being at present preferred owing to the fact that it is less expensive to construct. The sleeve 26 is preferably arranged at an inclination whereby oil deposited in the passage 32 will flow by gravity to the bearing 15.

From the bearing 15 the oil flows along the pin 18 to the bearing 16 for lubricating the same.

If desired, suitable means may be provided for conducting the oil from the upper to the lower bearing. As shown, a groove 44 extends along the upper portion of the king bolt, see Fig. 3, and on the side opposite from the oiling device an aperture 45 extends into the hollow 46 of the king bolt. An aperture 47 at the lower end of the king bolt conducts the oil from the hollow to the lower bearing. The space between the upper end of the king bolt and cap 19 will constitute what may be termed a reservoir for excess oil delivered by said oiling device. However, the parts are so adjusted that the amount of oil delivered under normal operating conditions will be substantially what is required for lubricating both the upper and lower bearings of the steering knuckle.

It is thought from the foregoing taken in connection with the accompanying drawing that the construction and operation of my device will be apparent to those skilled in the art and that changes in size, shape, proportion and details of construction may be made without departing from the spirit and scope of the appended claims.

I claim as my invention—

1. In a lubricating device, a receptacle for containing oil, a grooved plunger extending therefrom, an oil pad within said receptacle and a flat member having a slot interposed between said plunger and pad, said slot and groove being in alignment, whereby when said plunger is forced against said member when said receptacle contains oil, oil will flow from said pad through said slot into said groove.

2. In a lubricating device, a support, an oil retaining pad carried by said support, a plunger slidably mounted on said support and having a groove extending longitudinally thereof and opening upwardly, a flat member interposed between said plunger and pad, said member having a substantially vertical slot in communication with said groove but with its lower marginal edge terminationg above the bottom of said groove, whereby when said plunger is operated to compress said pad when the same contains oil, the oil therein will flow through said slot into said groove and will be prevented from being withdrawn from said groove when said pad is released.

3. In a lubricating device, a receptacle, a sleeve extending laterally from said receptacle, a plunger within said sleeve, said plunger having a passage extending longitudinally thereof, an oil retaining pad within said receptacle, a resilient pad positioning member within said receptacle adapted to be engaged by said plunger for compressing said pad and having an opening therein in communication with said passage, whereby when said part contains oil and said plunger is operated, oil will flow from said pad through said opening into and along said passage and means for preventing the return flow of said oil.

4. In a lubricating device, a receptacle for containing oil, a porous pad within said receptacle, a support for said receptacle, a plunger slidably mounted within said support, a passage extending longitudinally of said plunger and means operated by said plunger for compressing said pad for delivering increments of oil into said passage.

5. In a lubricating device, an oil receptacle, a support for said receptacle, oil absorbent material within said receptacle, a plunger slidably mounted within said support, said plunger having a passage therethrough, and means operated by said plunger for compressing said pad for delivering increments of oil to said passage.

6. In combination, a shaft member, a bearing member for said shaft member, one of said members being movable angularly relative to the other, an oil reservoir, an oil retaining pad therein, and means including a cam operated member operated by the relative angular movement of said members for compressing said pad for supplying oil to said members for lubricating the contacting parts thereof.

7. In combination, a bearing member, a journal member, one of said members being movable relative to the other, an oil pad, means for supplying oil to said pad whereby the same will be oiled by capillarity, and means operated by the relative movement of said members for compressing said pad and for supplying the oil compressed therefrom to the bearing surfaces of said members for lubricating the same.

8. In combination, a journal member, a bearing for said journal member, a cam surface on said journal member, an oil reservoir, a support therefor, said support being attached to said bearing, a plunger slidably mounted in said support and having a passage extending longitudinally thereof, said passage being in communication with said reservoir for conducting oil to said bearing, an oil pad in said reservoir and means operated by said plunger for compressing said pad for delivering oil to said passage for lubricating said bearing when said journal member and bearing are moved relative to each other.

9. In combination, a steering knuckle for the front wheel of an automobile, comprising a journal and a bearing, a cam surface on said journal, a receptacle for containing oil, a support for said receptacle secured to said bearing and extending laterally and upwardly therefrom, an oil pad within said receptacle, said pad receiving oil by capillarity from said receptacle, a member for compressing said pad, said member having an opening in its upper edge, a plunger for engaging said member and cam surface, a channel in said plunger in the vertical plane of said opening, the lower margin of said opening being above the bottom of said channel, whereby when said wheel is angularly steered said member will compress said pad for delivering increments of oil to said channel.

10. In combination, a steering knuckle for an automobile, comprising a bearing, a vertical shaft engaging said bearing and movable relative thereto, a reservoir, a member supplied with oil from said reservoir and means including a cam operated member operated by the relative movement of said shaft and bearing for compressing said member for supplying lubricant to said bearing.

11. In combination, a steering knuckle for an automobile, comprising a bearing, a journal engaging said bearing and movable relative thereto, a receptacle, an oil retaining member within said receptacle for containing a lubricant, a conduit in communication with said bearing and secured thereto and means including a plunger reciprocating within said conduit and operated by the relative movement of said journal and bearing for automatically supplying lubricant from said member to said conduit for lubricating said bearing.

12. In combination, a bearing, a journal in said bearing, a receptacle containing oil connected to said bearing, a passage opening into said receptacle above the oil level therein and connecting said receptacle with said bearing for conducting oil from said receptacle to said journal and bearing and means including an automatically operated reciprocating element extending into said receptacle for conducting oil along said element to said bearing from said receptacle.

13. A lubricating device comprising a reservoir for containing oil, an oil soaked pad within said reservoir and having its lower end seated in said oil, means for automatically compressing said pad for compressing oil therefrom and means including an elongated passage above the level of the oil within said reservoir for conducting the oil compressed from said pad to a bearing exteriorly of said reservoir.

14. In a motor vehicle, an axle, a stub axle, an upstanding king bolt for pivotally connecting said stub axle to said axle, said bolt being movable with said axle and having a flattened portion on its periphery, an oil reservoir adjacent to the upper end portion of said bolt, an oil passage for delivering oil from said reservoir to an upper portion of said bolt for lubricating the same by gravity and means including a reciprocating plunger normally engaging said flattened portion and automatically reciprocated by said bolt when said stub axle is turned in either direction for steering said vehicle for supplying oil to said passage.

15. In combination, a bearing, a journal rotatable in either direction within said bearing, an oil reservoir, means for supporting said reservoir adjacent to but exteriorly of said bearing, and means including a plunger reciprocating within said supporting means and having a passage extending longitudinally thereof for removing oil from said reservoir and transferring the same along said passage directly to said bearing upon the relative movement of said journal and bearing.

16. In a motor vehicle, a bearing, a journal element within said bearing and movable in either direction relative thereto, cam means carried by said journal, an oil reservoir, a hollow stem for supporting said reservoir adjacent to said bearing, and means including a reciprocating plunger member engaging said cam means and having an oil passage extending longitudinally thereof, for removing oil from said reservoir and conducting the same along said plunger to said journal upon the relative movement of said journal and bearing.

REMI J. GITS.